United States Patent
Brunn et al.

(10) Patent No.: US 10,972,422 B2
(45) Date of Patent: Apr. 6, 2021

(54) PRESENTING AN ELECTRONIC MESSAGE

(71) Applicant: International Business Machines Corporation, Armonk, NY (US)

(72) Inventors: Jonathan F. Brunn, Logan, UT (US); Jeffrey R. Hoy, Southern Pines, NC (US); Marit L. Imsdahl, Morrisville, NC (US); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 14/718,965

(22) Filed: May 21, 2015

(65) Prior Publication Data

US 2016/0344674 A1 Nov. 24, 2016

(51) Int. Cl.
*H04L 12/58* (2006.01)

(52) U.S. Cl.
CPC .............. *H04L 51/32* (2013.01); *H04L 51/08* (2013.01); *H04L 51/30* (2013.01); *H04L 51/12* (2013.01)

(58) Field of Classification Search
CPC ....... G06F 15/16; H04L 51/31; H04L 12/588; G06Q 99/00; G06Q 20/223; G06Q 50/01
See application file for complete search history.

(56) References Cited

U.S. PATENT DOCUMENTS

| | | | |
|---|---|---|---|
| 8,302,164 B2 | 10/2012 | Lunt | |
| 8,375,097 B2 | 2/2013 | Lawler et al. | |
| 8,380,802 B1 * | 2/2013 | King | G06Q 10/107 709/206 |
| 8,407,282 B2 * | 3/2013 | Cogan | G06Q 10/00 709/203 |
| 8,499,048 B2 * | 7/2013 | Malik | H04L 51/22 709/206 |
| 9,444,776 B2 * | 9/2016 | Albouyeh | H04L 51/32 |
| 9,471,898 B2 * | 10/2016 | Jania | G06Q 10/107 |
| 10,049,472 B1 * | 8/2018 | Croom | H04L 67/306 |
| 2005/0171954 A1 | 8/2005 | Hull | |
| 2007/0143407 A1 * | 6/2007 | Avritch | G06Q 10/107 709/206 |

(Continued)

FOREIGN PATENT DOCUMENTS

WO WO 2011114039 A1 * 9/2011 .......... G06Q 10/107

OTHER PUBLICATIONS

Visual Feedback System for Non-Visual Queues During Conference Calls, IBM, IPCOM000191205D, Dec. 21, 2009.

*Primary Examiner* — Dhairya A Patel
*Assistant Examiner* — Eui H Kim
(74) *Attorney, Agent, or Firm* — Fabian VanCott; Steven L. Nichols

(57) ABSTRACT

Presenting an electronic message includes receiving an electronic message, the electronic message includes a message originator, a message recipient, and a number of digital stamps wherein each of the number of digital stamps is associated with a social network, validating each digital stamp by contacting the social network associated with that digital stamp, when a digital stamp is validated, identifying a social relationship between the message recipient and the message originator using the social network corresponding to that digital stamp, and displaying, with the electronic message, an indication of the social relationship.

7 Claims, 5 Drawing Sheets

(56) References Cited

U.S. PATENT DOCUMENTS

| | | | |
|---|---|---|---|
| 2009/0210497 A1* | 8/2009 | Callanan | H04L 51/24 709/206 |
| 2009/0265431 A1* | 10/2009 | Jania | G06Q 10/107 709/206 |
| 2010/0166174 A1* | 7/2010 | Ghouti | H04L 9/3066 380/28 |
| 2011/0126001 A1* | 5/2011 | Fu | H04L 63/0823 713/156 |
| 2013/0219516 A1* | 8/2013 | Shimshoni | H04L 63/08 726/28 |
| 2014/0201292 A1* | 7/2014 | Savage | H04L 51/32 709/206 |
| 2014/0317213 A1* | 10/2014 | Zheng | H04L 51/32 709/206 |
| 2015/0074776 A1* | 3/2015 | Gonser | H04L 63/08 726/6 |
| 2015/0112865 A1* | 4/2015 | Seker | G06Q 20/223 705/44 |

* cited by examiner

US 10,972,422 B2

PRESENTING AN ELECTRONIC MESSAGE

BACKGROUND

The present invention relates to presenting an electronic message, and more specifically, to presenting the electronic message using a digital stamp.

A social network is a network based application to enable a user to create a user account. Once the user account is created, the user establishes connections with other users, such as friends, family, and colleagues, in an online environment. Further, once the user is connected with other users, the user may share information with each of the other users on the social network in the form of electronic messages by uploading pictures, updating personal information, updating status information, commenting on other users' information, sending private messages, sending instant messages (IM), among other activities.

BRIEF SUMMARY

A method for presenting an electronic message includes receiving an electronic message, the electronic message includes a message originator, a message recipient, and a number of digital stamps wherein each of the number of digital stamps is associated with a social network, validating each digital stamp by contacting the social network associated with that digital stamp, when a digital stamp is validated, identifying a social relationship between the message recipient and the message originator using the social network corresponding to that digital stamp, and displaying, with the electronic message, an indication of the social relationship.

A system for presenting an electronic message includes a processor, memory communicatively connected to the processor, and a presenting system including a receiving engine to receive an electronic message, the electronic message includes a message originator, a message recipient, and a number of digital stamps wherein each of the number of digital stamps is associated with a social network, a validating engine to validate each digital stamp by contacting the social network associated with each digital stamp, a retrieving engine to retrieve from the social network, based on a digital stamp, additional data associated with the electronic message, an identifying engine to identify, when the digital stamp is validated, a social relationship between the message recipient and the message originator using the social network corresponding to that digital stamp, and a displaying engine to display, with the electronic message, an indication of the social relationship.

A computer program product for presenting an electronic message, the computer program product includes a machine-readable storage medium having program instructions embodied therewith, the program instructions executable by a processor to cause the processor to receive an electronic message, the electronic message includes a message originator, a message recipient, and a number of digital stamps wherein each of the number of digital stamps is associated with a social network, validate each digital stamp by contacting the social network associated with each digital stamp, retrieve from a social network, based on a digital stamp, additional data associated with the electronic message, identify, when the digital stamp is validated, a social relationship between the message recipient and the message originator using the social network corresponding to that digital stamp, and display, with the electronic message, an indication of the social relationship.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
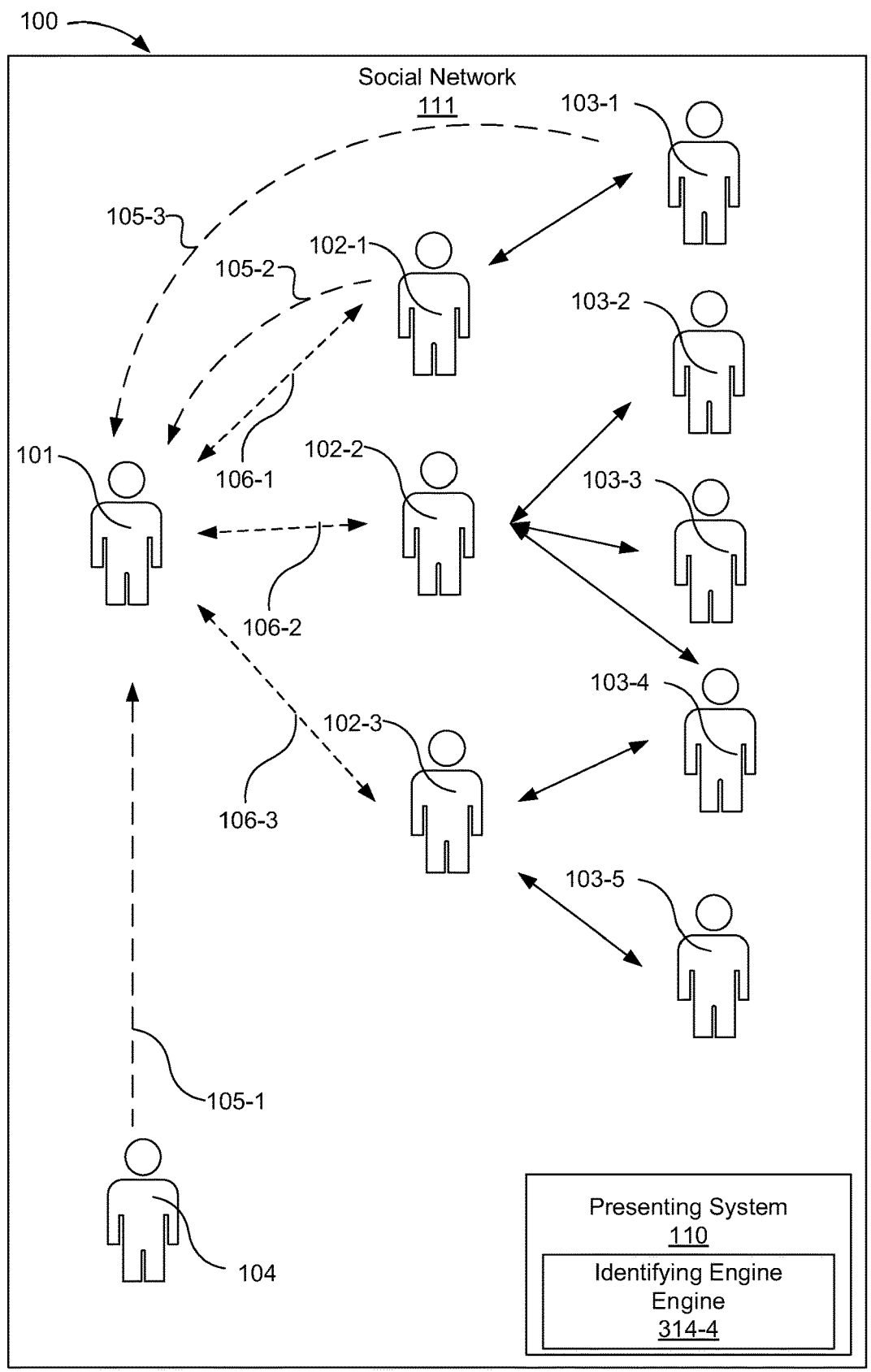
FIG. 1 is a diagram of a system for presenting electronic messages using a social network, according to one example of the principles described herein.

The present specification describes a method and system for presenting an electronic message to a recipient, such that the method or system displays, with the electronic message, the message recipient's social relationship to the message originator.

The present invention may be a system, a method, and/or a computer program product. The computer program product may include a computer readable storage medium (or media), having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, JavaScript, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus, to produce a machine such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or blocks or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, users may share information with each other on the social network in the form of electronic messages. Electronic messages provide a fast, low-cost way for users to communicate. As a result, users of the social network send and receive several electronic messages each day.

Often, commercial vendors associated with the social network are attracted to the use of the electronic messaging due to the low-cost. As a result, the users receive a number of unsolicited electronic messages from the commercial vendors. Further, users may receive unsolicited electronic messages from an imposter who has taken over a user account of the social network and are posing as a social connection of a user. An imposter may solicit information or request money from other users in an electronic message. As a result, a messaging system may attempt to filter these unsolicited electronic messages into a separate message folder for unsolicited electronic messages. To view these unsolicited electronic messages, the users periodically check the separate message folder to verify that electronic messages from known users are not filtered to the separate message folder. This may result in the users not viewing an important electronic message from other users because the important electronic messages were filtered into the separate message folder.

The principles described herein include a system and a method for presenting electronic messages. Such a system and method include receiving an electronic message, the electronic message including a message originator, a message recipient, and a number of digital stamps wherein each of the number of digital stamps is associated with a social network, validating each digital stamp by contacting the social network associated with that digital stamp, when a digital stamp is validated, identifying a social relationship between the message recipient and the message originator using the social network corresponding to that digital stamp, and displaying, with the electronic message, an indication of the social relationship. Such a system and method allow the social connection to be displayed with the electronic message to provide the message recipient with information as to the social relationship between the message recipient and the message originator.

In the present specification and appended claims, the term "electronic message" means digital communication between a number of users on a social network. Electronic messages may include electronic mail (email), text messages, instant messages (IM), and digitally recorded voice messages.

In the present specification and appended claims, the term "message client" means a system utilized for a process of sending and receiving electronic messages. A message client allows a user to prepare and send an electronic message. A message client allows a user to receive and view an electronic message.

In the present specification and in the appended claims, the term "digital stamp" means data provided by a social network to validate an electronic message. A digital stamp may include a digital signature, a hash value, an identification value based on a message originator and the contents of the electronic message, or similar data.

In the present specification and in the appended claims, the term "social network" means a network based application to enable a user to create a user account, establish social connections, and share information in the form of electronic messages. A social network is hosted on a number of social network servers.

In the present specification and in the appended claims, the term "social connection" means a relationship between two users of a social network. The social connection may be established when one user sends a friend request to another user and the other user accepts the friend request.

In the present specification and in the appended claims, the term "social relationship" means a series of social connections that connects a message originator and a message recipient. A social relationship may indicate that there is a social connection between a message originator and a message recipient. A social relationship may indicate that there is no social connection between the message originator and the message recipient.

In the present specification and in the appended claims, the term "imposter" means a user that has set up a user account on a social network to impersonate another user on the social network. An imposter may post pictures and information on the user account to make the user account appear authentic.

In the present specification and in the appended claims, the term "authentication measures" means a series of methods used to authenticate an electronic message or a user associated with a user account. An authentication measure may indicate that a user account or electronic message has been validated by a trusted source.

In the present specification and appended claims, the term "indication" means a mechanism displayed with an electronic message to alert a message recipient as to a social relationship the message recipient has with a message originator. The indication may be displayed via a display for a message interaction.

In the present specification and appended claims, the term "message originator" means a user that created an electronic message. A message sender is a user that causes an electronic message to be conveyed, via a network, to another user such as a message recipient.

In the present specification and appended claims, the term "message recipient" means a user that receives an electronic message. A message recipient may be specified by a user identifier or an alias that sends the electronic message to a number of users.

As used in the present specification and in the appended claims, the term "a number of" or similar language includes any positive number, including one to infinity; zero not being a number, but the absence of a number.

In the following description, for purposes of explanation, numerous specific details are set forth in order to provide a thorough understanding of the present systems and methods. It will be apparent, however, to one skilled in the art, that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of a system for presenting electronic messages using a social network, according to one example of the principles described herein. As will be described, a social network includes a number of users that are socially connected to each other. Further, once a user is connected with other users, the user may share information with each of the other users on the social network in the form of electronic messages by uploading pictures, updating personal information, updating status information, commenting on other users' information, sending private messages, sending IM, among other activities.

As illustrated, the system (100) includes a social network (111). The social network (111) may be implemented on a social network server. The social network (111) is a network based application to enable a user to create a user account. Once the user account is created, the user establishes connections with other users, such as friends, family, and colleagues, in an online environment. Further, once the user is connected with other users, the user may share information with each of the other users on the social network (111) in the form of electronic messages by uploading pictures, updating personal information, updating status information, commenting on other users' information, sending private messages, sending IM, among other activities. Further, the social network (111) manages social relationships between all users (101, 102, 103, 104).

As illustrated, the social network (111) includes a presenting system (110). As will be described in other parts of this specification, the presenting system (110) receives an electronic message. The electronic message includes a message originator, a message recipient (101), and a number of digital stamps wherein each of the number of digital stamps is associated with a social network. The presenting system (110) validates each digital stamp by contacting the social network associated with that digital stamp, when a digital stamp is validated. Further, the presenting system (110) includes an identifying engine (314-4) to identify a social relationship between the message recipient (101) and the message originator using the social network corresponding to that digital stamp. The presenting system (110) further displays, with the electronic message, an indication of the social relationship.

As illustrated, the social network (111) includes a number of users (101, 102, 103, and 104) that are socially connected to each other. The number of users (101, 102, 103, and 104) may include a message recipient (101), user A (102-1), user B (102-2), user C (102-3), user D (103-1), user E (103-2), user F (103-3), user G (103-4), user H (103-5), and an unconnected user (104). Further, each of the users (101, 102, 103, and 104) represents a user account that has been created for a specific user or a specific group of users for the social network (111).

Further, the users (102, 103, and 104) may be socially connected to each other and to the message recipient (101). The message recipient (101) may establish social connections as first degree social relationships, as indicated by the dotted arrows (106), with user A (102-1), user B (102-2), and user C (102-3). The first degree social relationships indicate that users are directly socially connected to each other. As a result, the message recipient (101) has a number of first degree social relationships with user A (102-1), user B (102-2), and user C (102-3).

Further, user A (102-1), user B (102-2), and user C (102-3) may be socially connected to user D (103-1), user E (103-2), user F (103-3), user G (103-4), and user H (103-5) as indicated by the solid arrows. User A (102-1), user B (102-2), and user C (102-3), may have a first degree social relationship with user D (103-1), user E (103-2), user F (103-3), user G (103-4), user H (103-5). As a result, user D (103-1), user E (103-2), user F (103-3), user G (103-4), and user H (103-5) have second degree social relationships with the message recipient (101).

Further, some users may not be socially connected to the message recipient (101). As illustrated, the unconnected user (104) is not socially connected to the message recipient (101). As a result, a social relationship between the unconnected user (104) and the message recipient (101) does not exist.

The message recipient (101) may receive a number of electronic messages, as indicated by the dashed arrows (105) from the number of users (102, 103, and 104). As will be described below, users who send electronic messages to the message recipient (101) are described as message originators.

In one example, an electronic message from a first degree social relationship is more likely to be more important to the message recipient (101) than an electronic message from a second degree social relationship. Further, an electronic message from a second degree social relationship is more important to the message recipient (101) than an electronic message from an unconnected user (104).

In one example, the unconnected user (104) communicates with the message recipient (101) as indicated by dashed arrow 105-1. The communication may be in the form of an electronic message such as an email message, an IM, a text message, a voice mail message, or a similar electronic message format. As will be described below, the presenting system (110) determines a social relationship between the message recipient (101) and the unconnected user (104). The social connection indicates that there is not a social relationship between the message recipient (101) and the unconnected user (104). The presenting system (110) displays, via a display of a user device, the electronic message and an indication of a lack of social connection between the message recipient (101) and the unconnected user (104).

In another example, a first degree social connection such as user A (102-1) sends the message recipient (101) an electronic message. The presenting system (110) indicates that the electronic message is being received from user A (102-1), a first degree social connection. The social relationship informs the message recipient (101) of the association with the first degree social connection user (102-1) via an indication that is displayed to the message recipient (101).

In yet another example, a second degree social connection such as user D (103-1) sends the message recipient (101) an electronic message. The presenting system (110) indicates that the electronic message is being received from user D (103-1), a second degree social connection. The social relationship informs the message recipient (101) that the electronic message from user D (103-1) is more likely to be important than an electronic message from the unconnected user (104). The social relationship informs the message recipient (101) that the electronic message from user D (103-1) is less likely to be important than an electronic message from a first degree social connection such as user A (102-1).

Information relating to the social relationship between a message recipient (101) and a message originator assists the message recipient (101) in recognizing the value of the message. The presenting system (110) may filter electronic messages based on social relationships. In addition to prioritizing electronic messages for a message recipient (101), the presenting system (110) may prevent the unconnected user (104) from impersonating a social relationship. The unconnected user (104) impersonating a user is an imposter. The imposter may be attempting to gain trust from the message recipient (101) to persuade the message recipient (101) into disclosing confidential information. By filtering the electronic messages from users based on social relationships, the presenting system (110) may prevent imposters from gaining access to confidential information.

While this example has been described with reference to the presenting system (110) being located on the social network (111), the presenting system (110) may be located on a separate computing device. For example, the presenting system (110) may be located on a server. The presenting system (110) may communicate with the social network (111) to obtain information relating to the social relationship of the users (101, 102, 103, 104). The presenting system (110) may communicate with the users (101, 102, 103, 104) to present the electronic messages with the social relationship. The presenting system (110) may be integrated into a user or client device, a server, a message system, other locations, or combinations thereof.

Figure 2:
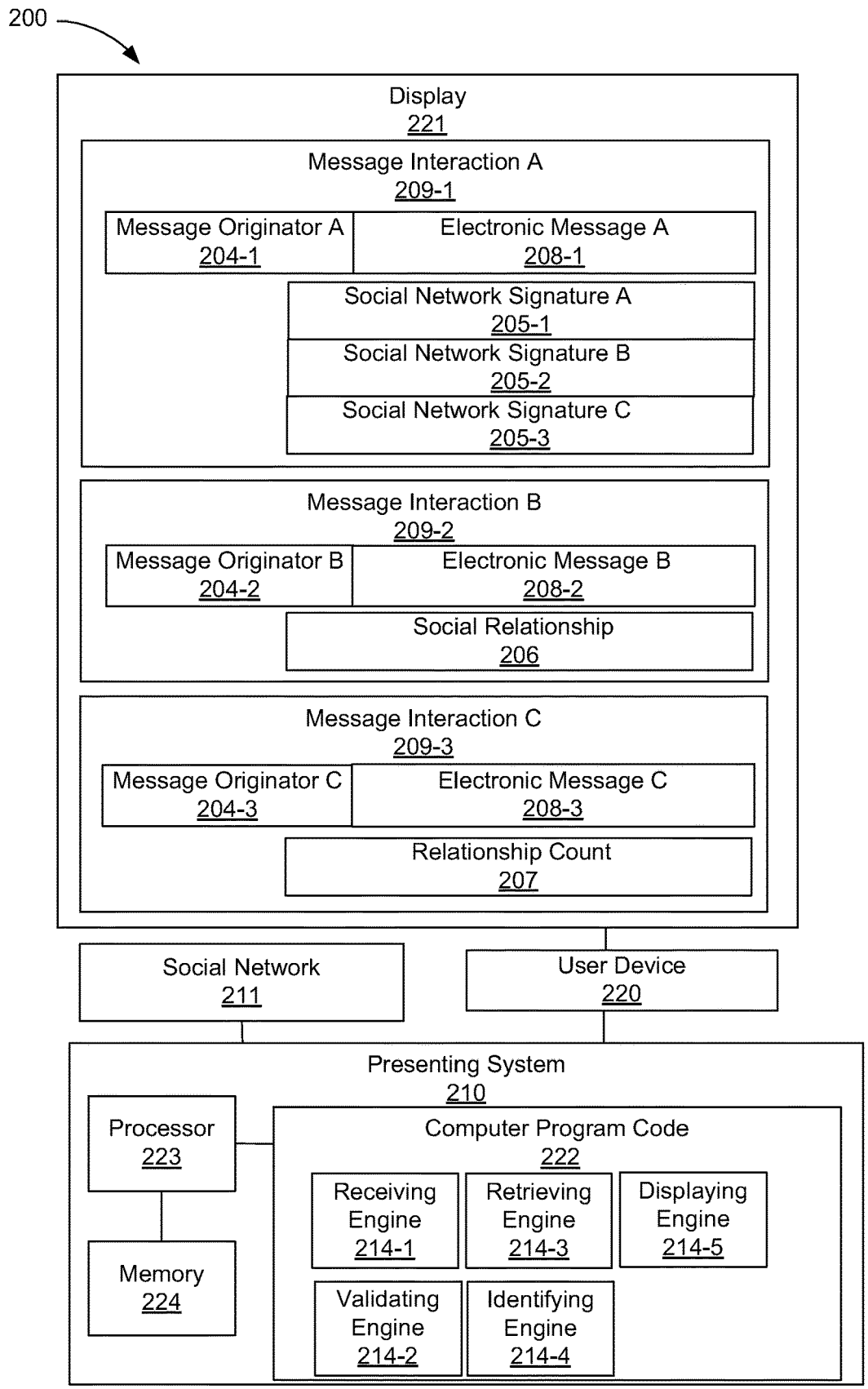
FIG. 2 is a diagram of a system for presenting electronic messages to a recipient, according to one example of the principles described herein.

FIG. 2 is a diagram of a system for presenting messages to a recipient, according to one example of the principles described herein. As will be described below, a presenting system is in communication with a social network. The presenting system may communicate with a number of different social networks. The presenting system may be a computing system that performs a number of functions as described above. The presenting system communicates with a user device. The user device displays, via a display a number of message interactions for a user.

As illustrated, the system (200) includes a presenting system (210). In one example, the presenting system (210) includes a processor (223), memory (224), and computer program code (222). The memory and the computer program code (222) are communicatively coupled to the processor (223). The memory (224) may be used to store data used by the computer program code (222). The computer program code (222) includes a number of engines (214). The engines (214) refer to program instructions for performing a designated function. The computer program code (222) causes the processor (223) to execute the designated function of the engines (214). In other examples, the engines (214) refer to a combination of hardware and program instructions to perform a designated function. Each of the engines (214) may include a processor and memory. The program instructions are stored in the memory and cause the processor to execute the designated function of the engine. As illustrated, the presenting system (210) includes a receiving engine (214-1), a validating engine (214-2), a retrieving engine (214-3), an identifying engine (214-4), and a displaying engine (214-5).

The receiving engine (214-1) receives an electronic message (208), the electronic message (208) includes a message originator (204), a message recipient, and a number of digital stamps wherein each of the number of digital stamps is associated with a social network. The electronic message (208) received may be a portion of the electronic message (208) destined for the message recipient. The electronic message received may indicate that the actual electronic message remains on the social network (211). The digital stamp may include a number of pieces of data used to authenticate an electronic message. A digital stamp may include a digital signature, a hash, an identification based on the combination of the message originator and the electronic message, or a combination thereof. The digital stamp may include protections to limit the number of times the digital stamp may be referenced. The digital stamp may include other information to validate the contents of the electronic message. A digital stamp may include data indicating a sum of the correct digits in the electronic message. When the sum does not match the contents of the electronic message the electronic message is deemed to be an imposter electronic message. The digital stamp may include an identification of the application that was used to produce the electronic message. The identification of the application provides increased confidence that the electronic message is legitimate. Further, the digital stamp may include a digital signature. The digital signature is used to decrypt a portion of the electronic message. The digital signature may prevent unauthorized access to the electronic message. Further, the digital stamp includes a hash value. The hash value is used to confirm that the electronic message is one of a number of messages that share the hash value. Further, the digital stamp is a value that is calculated based on a combination of attributes of the electronic message. The digital stamp is compared to a value calculated based on the same combination of attributes in the received electronic message. When the value received and the value calculated match, the electronic message is validated. An electronic message may include a number of digital stamps.

The validating engine (214-2) validates each digital stamp by contacting the social network (211) associated with that digital stamp. The validating engine contacts a trusted computing device associated with the social network (211). The validating engine (214-2) confirms that the digital stamp is valid. The digital stamp may be used to validate the identity of the message originator (204). A portion of the digital stamp may be used to validate the message originator (204). The message originator (204) identified by the digital stamp and the message originator identified by the electronic message (208) are to match or the electronic message is considered a fraud. The digital stamp may be used to validate the content of the electronic message (208). For example, a portion of the digital stamp may be a value that can be calculated based on the content of the electronic message. The value of the portion of the digital stamp is compared to a value calculated based on the content of the electronic message. When the two values match, the electronic message is considered to be authentic.

The digital stamp may be limited as to the number of times the digital stamp may be referenced. The digital stamp may only allow a single reference before the digital stamp is considered invalid. Restricting the number of times a digital stamp may be accessed reduces the chance that a digital stamp may be reused for nefarious purposes. The validating engine (214-2) may use a number of digital stamps to perform a number of different authentication measures to validate the electronic message.

The retrieving engine (214-3) may retrieve, based on the digital stamp, additional data associated with the electronic message. The electronic message received includes a digital stamp with a portion of the electronic message. The remainder of the electronic message is stored in the social network (211). The digital stamp is validated with the social network (211). The retrieving engine (214-3) then retrieves the remainder of the electronic message.

The identifying engine (214-4) identifies, when the digital stamp is validated, a social relationship between the message recipient and the message originator using the social network indicated by that digital stamp. As in figure one, the identifying engine (214-4) may identify a direct social connection between a message recipient and a message originator. The identifying engine (214-4) may identify that there is a relationship between the message recipient and the message originator. The identifying engine (214-4) may identify a number of users that connect the message recipient and the message originator through social connections. The number of users that connect the message recipient and the message originator with social connections may be described as the number of degrees of separation. The identifying engine (214-4) may identify that there is no social connection between the message recipient and the message originator. The social relationship may be within a single social network. When a social relationship is within a single social network, all the users that create the social connections belong to the single social network.

The displaying engine (214-5) displays, with the electronic message, an indication of the social relationship. In a first example, the displaying engine (214-5) displays that the message recipient and the message originator have a direct social connection between the users. In a second example, the displaying engine (214-5) displays a number of users that form a social connection between the message recipient and the message originator. In a third example, the displaying engine (214-5) displays that there is no social connection between the message originator and the message recipient. In a fourth example, the displaying engine (214-5) indicates a common interest between the message recipient and the message originator. The displaying engine (214-5) may filter the presentation of a message based on the social relationship. An electronic message may not be displayed when the social relationship exceeds a threshold, exceeding the threshold indicating that the social relationship is too distant for the message to be displayed.

As illustrated, the presenting system (210) presents three different formats of message interactions (209) for the electronic messages (208). The formats of the message interactions (209) include message interaction A (209-1), message interaction B (209-2), and message interaction C (209-3). Further, additional formats may be presented by the presenting system (210). The displaying engine (214-5) of the presenting system (210) displays the electronic messages (208) to a message recipient as part of the message interactions (209) in a display (221). The message interactions (209) may include additional information related to the electronic messages (208).

Message interaction A (209-1) illustrates the presentation of electronic message A (208-1). Electronic message A (208-1) is received by the presenting system (210) for a message recipient. Further, message originator A (204-1) is presented as the originator of electronic message A (208-1). A number of social network signatures (205) are presented as part of message interaction A (209-1). As illustrated, the presenting system (210) presents social network signature A (205-1), social network signature B (205-2) and social network signature C (205-3). The social network signatures (205) shows that each of the digital stamps has been authenticated with the social network (111). The social network signatures (205) may indicate the social network associated with the social network signatures (205). Social network signature A (205-1) may indicate the digital stamp has been authenticated with social network A. A social network signature may indicate characters or tokens provided by the social network. Social network signature B (205-2) may indicate that the digital stamp associated with social network B has been authenticated. Social network signature C (205-3) may indicate the digital stamp has been authenticated with social network C. The social network signature (205) may be presented in a format that can be understood by the message recipient. A number of social network signatures (205) for a number of social networks may be presented. The presenting system (210) may be designed to display the social network signatures (205). The presenting system (110) may display the social network signatures (205) for unconnected users.

Message interaction B (209-2) illustrates the presentation of electronic message B (208-2). Electronic message B (208-2) is received by the presenting system (210) for a message recipient. Electronic message B (208-2) is presented, via the display engine (214-5), as part of message interaction B (209-2). Message originator B (204-2) is presented as the originator of electronic message B (208-2). A social relationship (206) is presented to illustrate the relationship between message originator B (204-2) and the message recipient. If message originator B (204-2) is a first degree social connection, the social relationship (206) indicates that there is a social connection between the message recipient and message originator B (204-2). If message originator B (204-2) is a second degree social connection, the social relationship (206) indicates there is a second degree social connection that connects the message recipient and message originator B (204-2). Additional social connections may be displayed as part of the social relationship (206). If message originator B (204-2) is an unconnected user the social relationship (206) indicates that there is not a social connection between the message recipient and message originator B (204-2).

Message interaction C (209-3) illustrates the presentation of electronic message C (208-3). Electronic message C (208-3) is received by the presenting system (210) for a message recipient and is presented as part of message interaction C (209-3). Message originator C (204-3) is presented as the originator of electronic message C (208-3). A relationship count (207) is presented to illustrate a social relationship with message originator C (204-3). The relationship count (207) indicates a number of social connections between message originator C (204-3) and the message recipient (FIG. 1, 101). If message originator C (204-2) is a first degree social connection, the relationship count (207) indicates that there is one social connection between the message recipient and message originator C (204-3). If message originator C (204-3) is a second degree social connection, the relationship count (207) indicates there are two social connections between message recipient and message originator C (204-2). If message originator C (204-3) is an unconnected user, the relationship count (207) indicates that there is not a social connection between the message recipient and message originator C (204-2). Further, other relationship counts of additional social connections may be displayed as part of message interaction C (209-3).

Figure 3:
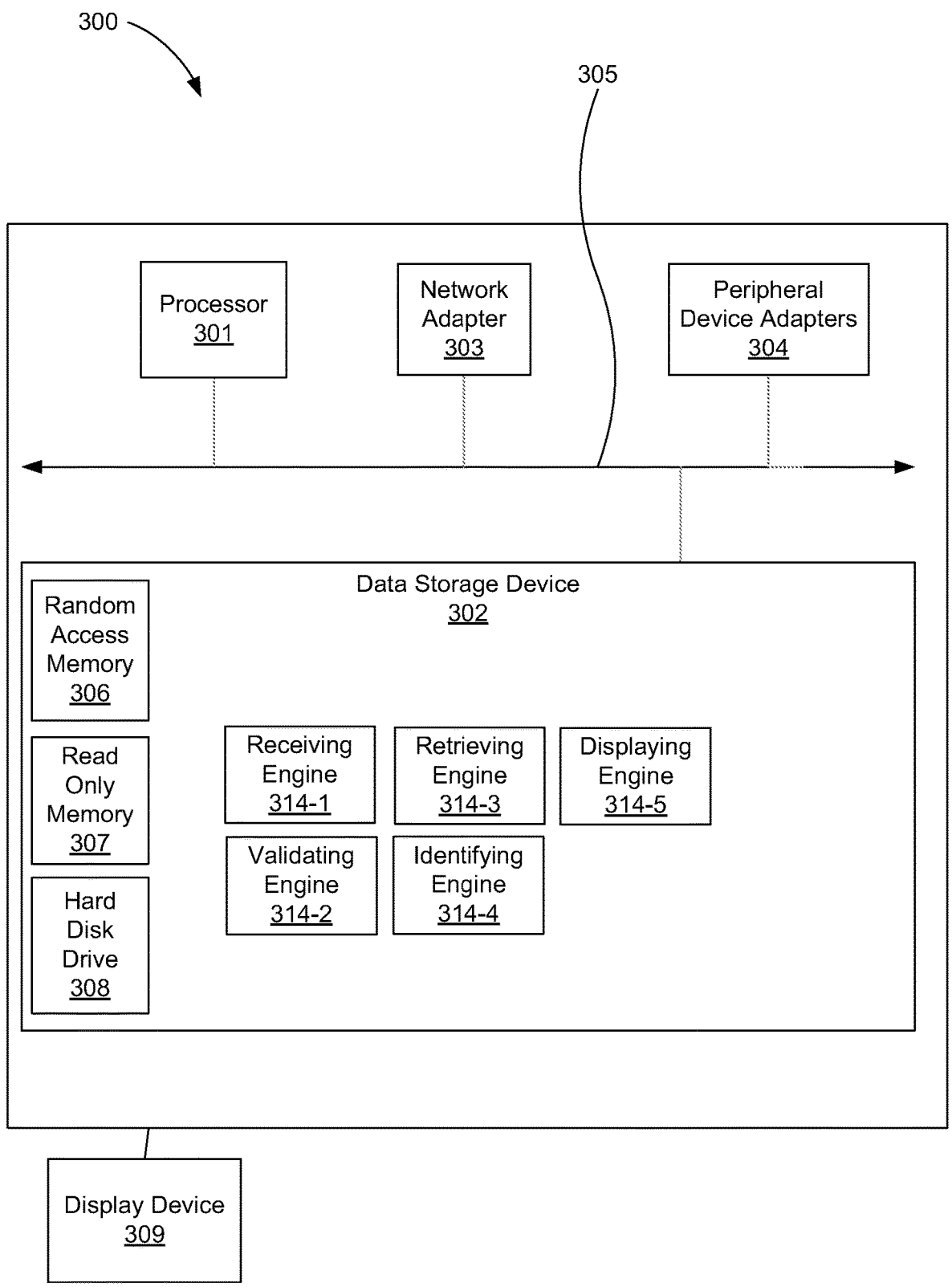
FIG. 3 is a diagram of an example of a presenting system for presenting electronic messages using a digital stamp, according to the principles described herein.

FIG. 3 is a diagram of an example of a presenting system for presenting electronic messages using a digital stamp, according to one example of the principles described herein. The presenting system (300) for presenting electronic messages using a digital stamp may be implemented in an electronic device. Examples of electronic devices include servers, desktop computers, laptop computers, personal digital assistants (PDAs), mobile devices, smartphones, gaming systems, and tablets, among other electronic devices.

The presenting system (300) may be utilized in any data-processing scenario, including stand-alone hardware, mobile applications, a computing network, or combinations thereof. Further, the presenting system (300) may be used in a computing network, a public cloud network, a private cloud network, a hybrid cloud network, other forms of networks, or combinations thereof. In one example, the methods provided by the presenting system (300) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, networks, and components, among others; application program interface (API) as a service (APIaaS), other forms of network services, or combinations thereof. The present systems may be implemented on one or multiple hardware platforms, in which the engines in the system can be executed on one or across multiple platforms. Such engines can run on various forms of cloud technologies and hybrid cloud technologies or offered as a SaaS (Software as a service) that can be implemented on or off the cloud. In another example, the methods provided by the presenting system (300) are executed by a local administrator.

To achieve its desired functionality, the presenting system (300) may include various hardware components. Among these hardware components may be a number of processors (301), a number of data storage devices (302), a number of peripheral device adapters (304), and a number of network adapters (303). These hardware components may be interconnected through the use of a number of buses and/or network connections. In one example, the processor (301), data storage device (302), peripheral device adapters (304), and a network adapter (303) may be communicatively coupled via a bus (305).

The data storage device (302) may store data, such as executable program code, that is executed by the processor (301) or other processing device. As will be discussed, the data storage device (302) may specifically store computer code representing a number of applications that the processor (301) executes to implement at least the functionality described herein.

The data storage device (302) may include various types of memory modules, including volatile and nonvolatile memory. For example, the data storage device (302) of the present example includes Random Access Memory (RAM) (306), Read Only Memory (ROM) (307), and Hard Disk Drive (HDD) memory (308). Many other types of memory may also be utilized, and the present specification contemplates the use of as many varying type(s) of memory in the data storage device (302) as may suit a particular application of the principles described herein. In certain examples, different types of memory in the data storage device (302) may be used for different data storage needs. For example, in certain examples, the processor (301) may boot from Read Only Memory (ROM) (307), maintain nonvolatile storage in the Hard Disk Drive (HDD) memory (308), and execute program code stored in Random Access Memory (RAM) (306).

Generally, the data storage device (302) may include a computer readable medium, a computer readable storage medium, or a non-transitory computer readable medium, among others. For example, the data storage device (302) may be, but is not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The hardware adapters (303, 304) in the presenting system (300) enable the processor (301) to interface with various other hardware elements, external and internal to the presenting system (300). For example, the peripheral device adapters (304) may provide an interface to input/output devices, such as, for example, a display device (309), a mouse, or a keyboard. The peripheral device adapters (303) may also provide access to other external devices, such as an external storage device, a number of network devices such as, for example, servers, switches, and routers, client devices, other types of computing devices, and combinations thereof.

The display device (309) may be provided to allow a user of the presenting system (300) to interact with and implement the functionality of the presenting system (300). The peripheral device adapters (304) may also create an interface between the processor (301) and the display device (309), a printer, or other media output devices. The network adapter (303) may provide an interface to other computing devices within, for example, a network, thereby enabling the transmission of data between the presenting system (300) and other devices located within the network.

The presenting system (300) may, when executed by the processor (301), display the number of graphical user interfaces (GUIs) on the display device (309) associated with the executable program code, representing the number of applications stored on the data storage device (302). The GUIs may include aspects of the executable code, including displaying messages to a user using a digital stamp. The GUIs may display, for example, a message with the social connection of the message recipient and the message originator. Additionally, a user may detect an imposter when a user appears to be a social connection but lacks a social relationship with the message recipient. Examples of display devices (309) include a computer screen, a laptop screen, a mobile device screen, a personal digital assistant (PDA) screen, and a tablet screen, among other display devices (309). Examples of the GUIs displayed on the display device (309) will be described in more detail below.

The presenting system (300) may include a number of engines used in the implementation of the electronic message presenting system. The various engines within the presenting system (300) include executable program code that may be executed separately. In this example, the various engines may be stored as separate computer program products. In another example, the various engines within the presenting system (300) may be combined within a number of computer program products; each computer program product includes a number of the engines.

Aspects of the present system and method are described herein with reference to flowchart illustrations and/or block diagrams of methods, apparatus (systems) and computer program products, according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (301) of the presenting system (300) or other programmable data processing apparatus, implements the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The presenting system (300) includes a receiving engine (314-1) to receive an electronic message. The presenting system (300) includes a validating engine (314-2) to validate each digital stamp by contacting the social network associated with each digital stamp. The presenting system (300) may include a retrieving engine (314-3) to retrieve, from a social network, additional data associated with the electronic message. The presenting system (300) includes an identifying engine (314-4) to identify a social relationship between the message recipient and the message originator, using the social network corresponding to that digital stamp. The presenting system (300) includes a displaying engine (314-5) to display, with the electronic message, an indication of the social relationship.

The receiving engine (314-1) receives an electronic message. The electronic message includes a message recipient, a message originator, and a number of digital stamps. Each of the number of digital stamps is associated with a social network. A digital stamp is used to validate the identity of the message originator or to validate the content of an electronic message. The digital stamp may include a time indicator. The time indicator indicates an amount of time the digital stamp is valid. Limiting the amount of time a digital stamp is valid reduces the probability that the digital stamp may be misused. The digital stamp may indicate an application that produced the electronic message. The digital stamp may include a digital signature, hash, identifier, or combination thereof. The identifier may be based on a combination of the message originator and the content of the electronic message.

The validating engine (314-2) validates each digital stamp by contacting the social network associated with each digital stamp. The presenting system (300) may store a number of identifiers for a number of social networks that support digital stamps. The validating engine (314-2) communicates with a social network that supports the digital stamps to verify the digital stamp. The verification of the digital stamp verifies that the message has been processed by the social network. The verification of the digital stamp may confirm the identity of the message originator. The verification of the digital stamp may include verifying the contents of the electronic message.

The retrieving engine (314-3) retrieves, from the social network, based on a digital stamp, additional data associated with the electronic message. The digital stamp is associated with a social network. Additional data associated with the electronic message is stored on the social network. The retrieving engine (314-3) retrieves the additional data from the social network. The additional data is displayed as part of the electronic message.

The identifying engine (314-4) identifies a social relationship between the message recipient and the message originator. The identifying engine (314-4) identifies the social relationship when the digital stamp is verified. The identifying engine (314-4) may identify a social relationship within a single social network. An example of a social relationship within a single social network includes when all users in a chain of the social relationship are members of a social network. The identifying engine (314-4) may identify a social relationship that spans a number of social networks. An example of a social relationship that spans social networks includes when a message recipient has a social relationship with a user that is a first degree social connection in a first social network. The first degree social connection has a social relationship with a second degree social connection in a second social network. The social connection between the message recipient and the second degree social connection spans two social networks. As a result, the identifying engine (314-4) may identify the closest relationship between the message recipient and the message originator. The social relationship may consider social connections such as interpersonal relationships, common interests, common employment, and common attributes. An interpersonal relationship shows a friendship, business relationship, or other connection between two users. A common interest may be a social relationship. A number of users that share an interest in a topic. The common interest indicates a reason the users will communicate. A common employment may be a social relationship. Users that work at the same company are considered social connections. A common employer indicates a reason the users will communicate. A common attribute may be considered a social connection. For example, users that speak a common language may be considered to have a social connection. A social relationship may be identified within a single social network or may span a number of social networks. A social relationship that spans a number of social networks includes connections between users that include different connections in different social networks.

The displaying engine (314-5) displays an indication of the social relationship with the electronic message. The indication of the social relationship may include displaying a number of social connections connecting the message recipient and the message originator. The indication of the social relationship may include displaying a summary of the social relationship. For example, the summary may include displaying a number of users between the message recipient and the message originator. The displaying engine (314-5) may filter an electronic message based on the social relationship. For example, an electronic message may not be displayed if the social relationship between the message recipient and the message originator is not a single social connection.

An example of the presenting system (300) presenting an electronic message (FIG. 2, 208) will now be given. The presenting system (300) receives, with a receiving engine (314-1), an electronic message (FIG. 2, 208). The electronic message (FIG. 2, 208) indicates that the message originator (FIG. 2, 204) is a second degree social connection (FIG. 1, 103-1). The electronic message (FIG. 2, 208) indicates a message recipient (FIG. 1, 101). The electronic message (FIG. 2, 208) includes a digital stamp. The digital stamp is associated with a social network hosted on a social network (FIG. 1, 111).

The presenting system (300) validates, with a validating engine (314-2), that the digital stamp is valid. The validating engine (314-2) contacts the social network server (FIG. 1, 111) associated with the digital stamp to validate the digital stamp. A validated digital stamp indicates that the electronic message and the message originator are authentic. The validating engine (314-2) may provide data to the social network (FIG. 1, 111) to allow the social network (FIG. 1, 111) to validate the electronic message (FIG. 2, 208).

The presenting system (300) retrieves, with a retrieving engine (314-3), additional data associated with the electronic message (FIG. 2, 208). The text of the electronic message (FIG. 2, 208) is stored on the social network (FIG. 1, 111). The text is retrieved from the social network (FIG. 1, 111) and displayed as part of the electronic message (FIG. 2, 208).

The presenting system (300) identifies, with an identifying engine (314-4), a social relationship (FIG. 2, 206) between the message recipient (FIG. 1, 101) and the second degree social connection user D (FIG. 1, 103-1). The social relationship (FIG. 2, 206) is the social relationship of the message originator (FIG. 1, 101) and a first degree social connection user A (FIG. 1, 102-1), and the social relationship of the first degree social connection user A (FIG. 1, 102-1) and a second degree social connection user D (FIG. 1, 103-1).

The presenting system (300) displays, with a displaying engine (314-5), the social relationship (FIG. 2, 206) with the electronic message (FIG. 2, 208). The social relationship shows that the message recipient (FIG. 1, 101) has a first degree social connection with user A (102-1). The social relationship shows that user A (102-1) has a first degree social connection with user D (103-1).

Figure 4:
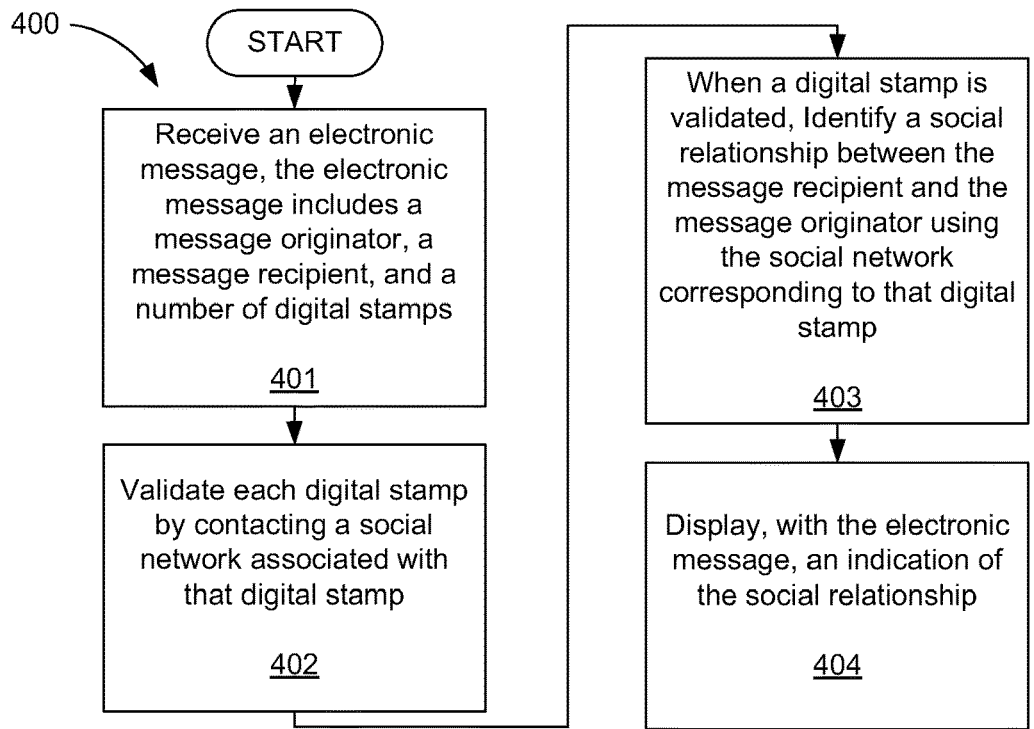
FIG. 4 is a flowchart of an example of a method for presenting an electronic message, according to one example of principles described herein.

FIG. 4 is a flowchart of an example of a method for presenting an electronic message, according to one example of principles described herein. The method (400) may be executed by the presenting system of FIG. 1. The method (400) may be executed by other systems (i.e. system 300 and system 700). The method (400) includes receiving (401) an electronic message, the electronic message includes a message originator, a message recipient, and a number of digital stamps, validating (402) each digital stamp by contacting the social network associated with that digital stamp, when a digital stamp is validated, identifying (403) a social relationship between the message recipient and the message originator using the social network corresponding to that digital stamp, and displaying (404), with the electronic message, an indication of the social relationship.

As mentioned above, the method (400) includes receiving (401) an electronic message, the electronic message includes a message originator, a message recipient, and a number of digital stamps. Each digital stamp is associated with a social network. Each social network maybe supported by a number of social network servers.

As mentioned above, the method (400) includes validating (402) each digital stamp by contacting the social network associated with that digital stamp. The system executing the method (400) is in contact with a number of social networks. The system contacts a social network to validate that the digital stamp was issued for that social network.

As mentioned above, the method (400) includes when a digital stamp is validated, identifying (403) a social relationship between the message recipient and the message originator. The method (400) may identify the closest social relationship between the message recipient and the message originator.

As mentioned above, the method (400) includes displaying (404), with the electronic message, an indication of the social relationship. The indication of the social relationship may include a number of social connections connecting the message recipient and the message originator. Displaying (405) the indication of the social relationship may include displaying a summary of the social relationship. The summary may include a count of social relationships between the message recipient and the message originator.

Figure 5:
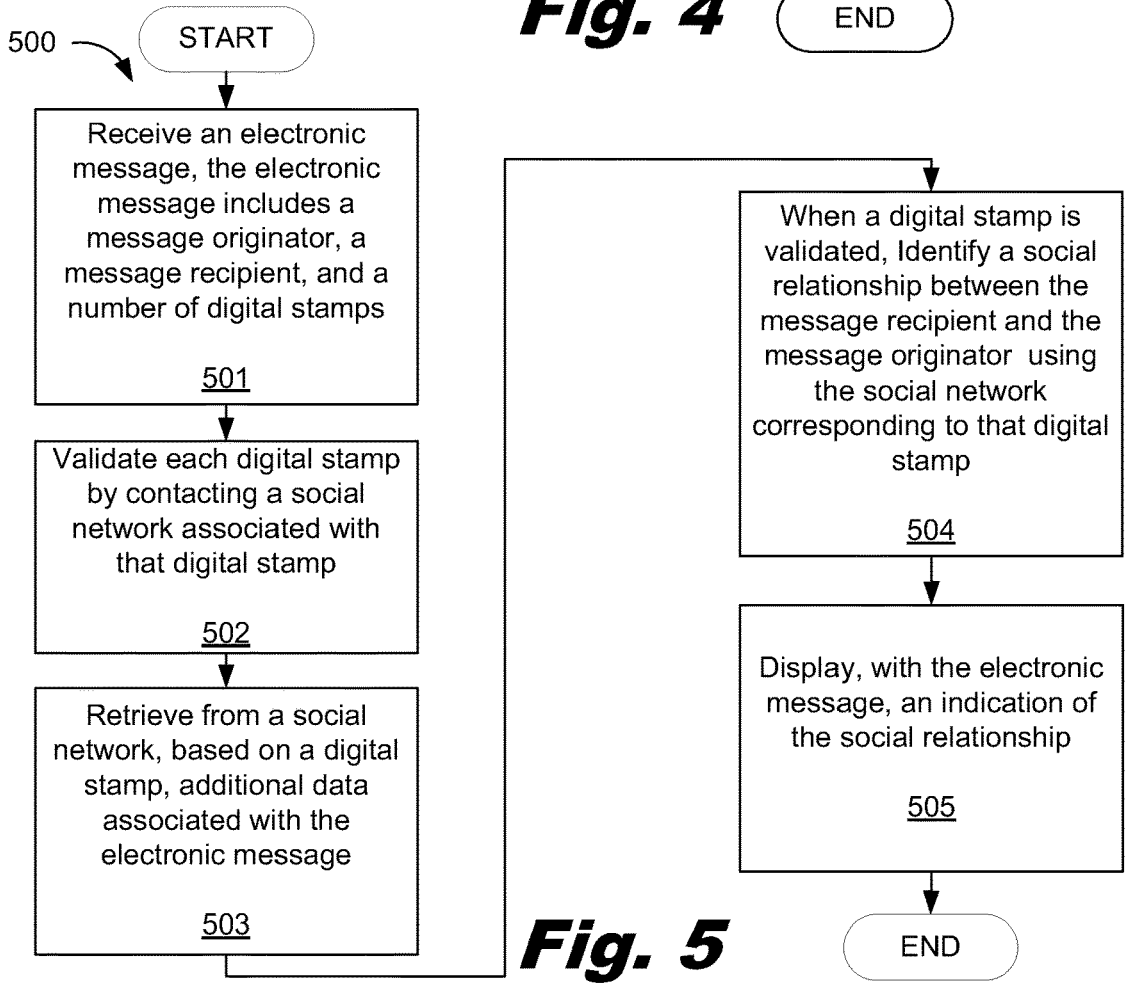
FIG. 5 is a flowchart of an example of a method for presenting an electronic message, according to one example of principles described herein.

FIG. 5 is a flowchart of an example of a method for presenting an electronic message, according to one example of principles described herein. The method (500) may be executed by the presenting system of FIG. 1. The method (500) may be executed by other systems (i.e. system 300 and system 700). The method (500) includes receiving (501) an electronic message, the electronic message includes a message originator, a message recipient, and a number of digital stamps validating (502) each digital stamp by contacting the social network associated with that digital stamp, retrieving (503), from a social network, based on a digital stamp, additional data associated with the electronic message, when a digital stamp is validated, identifying (504) a social relationship between the message recipient and the message originator using the social network corresponding to that digital stamp, and displaying (505), with the electronic message, an indication of the social relationship.

As mentioned above, the method (500) includes retrieving (503), from a social network, based on a digital stamp, additional data associated with the electronic message. The electronic message includes an identification of a message recipient, an identification of a message originator, and a digital stamp. Additional data is retrieved (503) from a social network. The additional data may represent a portion of the actual electronic message from the message originator to the message recipient. The electronic message received may contain a portion of the actual message, with the remainder of the actual message being retrieved from the social network. The portion of the actual message that is retrieved may be transmitted over a secure protocol, preventing unauthorized access to the portion of the message that is retrieved.

Figure 6:
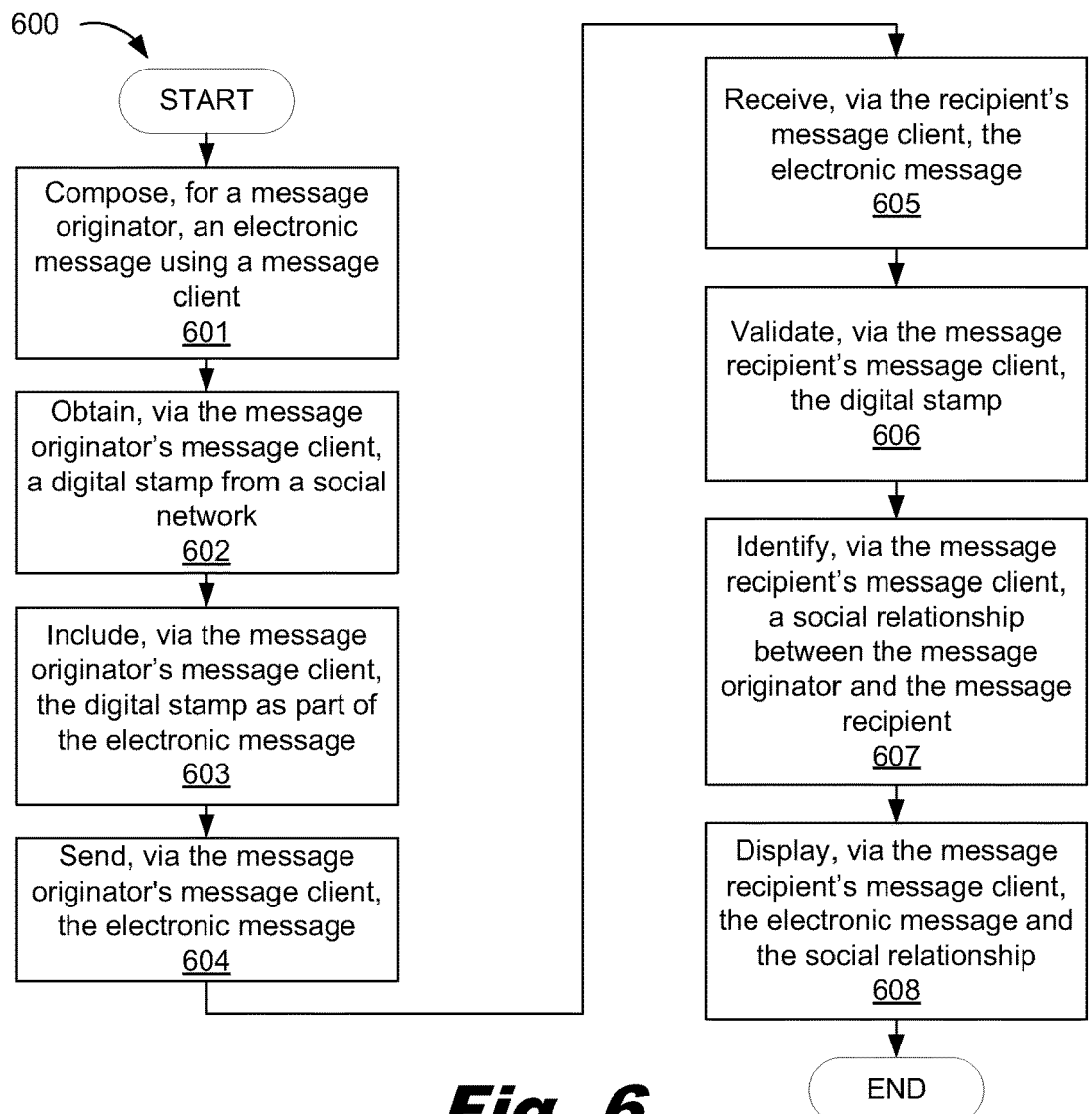
FIG. 6 is a flowchart of an example of a method for sending and receiving an electronic message with a digital stamp, according to one example of the principles described herein.

FIG. 6 is an example of a method for sending and receiving an electronic message with a digital stamp, according to one example of principles described herein. The method (600) includes composing (601), for a message originator, an electronic message using a message client, obtaining (602), via the message originator's message client, a digital stamp from a social network, including (603), via the message originator's message client, the digital stamp as part of the electronic message, sending (604), via the message originator's message client, the electronic message, receiving (605), via the message recipient's message client, the electronic message, validating (606), via the message recipient's message client, the digital stamp, identifying (607), via the message recipient's message client, a social relationship between the message originator and the message recipient, and displaying (608), via the message recipient's message client, the electronic message and the social relationship.

As mentioned above, the method (600) includes composing (601), for a message originator, an electronic message using a message client. The message originator composes (601) an electronic message using a message client. The message client may be an email client, an instant messaging system, a digital voice system, a text message system, or similar systems to send or receive electronic messages.

As mentioned above, the method includes obtaining (602), via the message originator's message client, a digital stamp from a social network. The digital stamp may contain a digital signature, a hash, a unique identification based on a combination of parts of the electronic message, or a combination thereof.

As mentioned above, the method (600) includes including (603), via the message originator's message client, the digital stamp as part of the electronic message. The message originator's message client associates the digital stamp with the electronic message. The message originator's message client may include the digital stamp as part of the electronic message by inserting the digital stamp in the electronic message, or by attaching a token to the electronic message.

As mentioned above, the method (600) includes sending (604), via the message originator's message client, the electronic message. The message originator's message client uses an electronic message communication system to send the electronic message.

As mentioned above, the method includes receiving (605), via the message recipient's message client, the electronic message. The electronic message received may be an email, text message, digital voice recording, or a message in a similar electronic message passing protocol.

As mentioned above, the method (600) includes validating (606), via the message recipient's message client, the digital stamp. The validation may include contacting a social network server. The validation may include applying a transformation to the digital stamp. In one example, a system using the method (600) may contact the social network with the digital stamp. As part of validating (606) the digital stamp, the social network may return a version of the stamp that contains additional data, such as a security token to decrypt the electronic message. In another example, the digital stamp may be in an initial format. By validating (606) the digital stamp the digital stamp is transformed into a second format for use in handling the electronic message.

As mentioned above, the method includes identifying (607), via the message recipient's message client, a social relationship with the message originator. The social relationship indicates degrees of separation between a message recipient and a message originator.

As mentioned above, the method includes displaying (608), via the message recipient's message client, the electronic message and the social relationship. The displaying may display the social connection with the electronic message to inform the message recipient of the relationship with the message originator.

Figure 7:
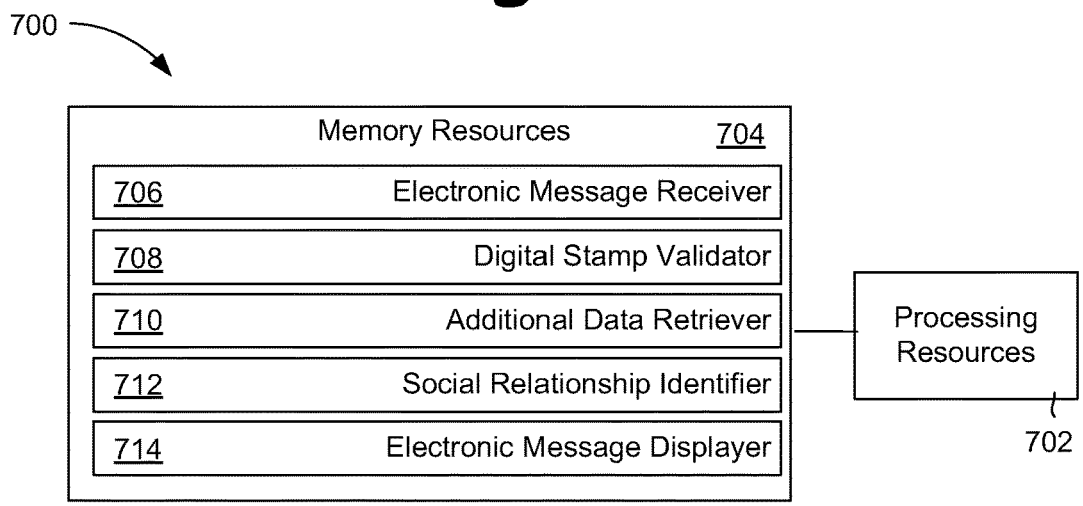
FIG. 7 is a diagram of a presenting system, according to one example of the principles described herein.

FIG. 7 is a diagram of an example of a presenting system (700), according to the principles described herein. In this example, the presenting system (700) includes processing resources (702) that are in communication with memory resources (704). Processing resources (702) include at least one processor and other resources used to process programmed instructions. The memory resources (704) generally represent any memory capable of storing data, such as programmed instructions or data structures used by the presenting system (700). The programmed instructions shown stored in the memory resources (704) include an electronic message receiver (706), a digital stamp validator (708), an additional data retriever (710), a social relationship identifier (712), and an electronic message displayer (714).

The memory resources (704) include a computer readable storage medium that contains computer readable program code to cause tasks to be executed by the processing resources (702). The computer readable storage medium may be a tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, other types of memory, or combinations thereof.

The electronic message receiver (706) represents programmed instructions that, when executed, cause the processing resource (702) to receive an electronic message, the electronic message including a digital stamp. The digital stamp validator (708) represents programmed instructions that, when executed, cause the processing resource (702) to validate the digital stamp.

The additional data retriever (710) represents programmed instructions that, when executed, cause the processing resource (702) to retrieve additional data associated with the electronic message based on the digital stamp. The social network identifier (712) represents programmed instructions that, when executed, cause the processing resource (702) to identify a social relationship between a message recipient and a message originator. The electronic message displayer (714) represents programmed instructions that, when executed, cause the processing resource (702) to display an indication of the social relationship with the electronic message.

Further, the memory resources (704) may be part of an installation package. In response to installing the installation package, the instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, the presenting system (700) may be implemented on a user device, on a server, on a collection of servers, or combinations thereof.

The presenting system (700) of FIG. 7 may be part of a general purpose computer. However, in alternative examples, the presenting system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

What is claimed is:

1. A system for presenting an electronic message, the system comprising:

a processor;

memory communicatively connected to the processor; and a presenting system, the presenting system comprising:

a receiving engine, comprising the processer and the memory, to receive an encrypted electronic message, the electronic message comprising a message originator, a message recipient, and a digital stamp wherein the digital stamp is associated with a social network, wherein each digital stamp comprises an identification value based on the message originator and a contents of the electronic message;

a validating engine, comprising the processer and the memory, to validate the digital stamp by contacting the social network associated with each digital stamp wherein the digital stamp limits a number of times the digital stamp is referenced and to transform the digital stamp into a token and to use the token to decrypt the encrypted message;

a retrieving engine, comprising the processer and the memory, to retrieve from the social network, based on the digital stamp, additional data associated with the electronic message, the additional data comprising a remaining portion of the electronic message not originally included in the electronic message;

an identifying engine, comprising the processer and the memory, to identify, when the digital stamp is validated, a social relationship between the message recipient and the message originator using the social network corresponding to that digital stamp; and a displaying engine, comprising the processer and the memory, to display, with the electronic message, an indication of a closest degree of the social relationship in multiple social networks, the degree of the social relationship comprising an identification as to whether the message originator and the message recipient are directly socially connected or indirectly socially connected based on the social network, the digital stamp defining the degree of social relationship and wherein the social relationship is displayed with the electronic message; and filtering the electronic messages based on the social relationship in response to a determination that the social relationship exceeds a threshold as defined by the digital stamp, the threshold indicating that the social relationship is too distant to allow access to the additional data associated with the electronic message.

2. The system of claim 1, wherein the digital stamp includes protections to limit the number of times the digital stamp may be referenced.

3. The system of claim 1, wherein the social relationship is a social relationship within the social network.

4. The system of claim 1, wherein the electronic message includes a number of authentication measures.

5. A computer program product for presenting an electronic message, the computer program product comprising a machine-readable storage medium having program instructions embodied therewith, the program instructions executable by a processor to cause the processor to:

receive an encrypted electronic message, the electronic message comprising a message originator, a message recipient, and a digital stamp wherein the digital stamp is associated with a social network, wherein each digital stamp comprises an identification value based on the message originator and a contents of the electronic message;

validate the digital stamp by contacting the social network associated with the digital stamp;

retrieve from a social network, based on the digital stamp, additional data associated with the electronic message, the additional data comprising a remaining portion of the electronic message not originally included in the electronic message;

transform the digital stamp to generate a token;

decrypt the encrypted electronic message using the token;

identify, when the digital stamp is validated, a social relationship between the message recipient and the message originator using the social network corresponding to that digital stamp;

display, with the electronic message, an indication of a degree of the social relationship, the degree of the social relationship comprising an identification as to whether the message originator and the message recipient are directly socially connected or indirectly socially connected based on the social network, the digital stamp defining the degree of social relationship; and filter the electronic messages based on the social relationship in response to a determination that the social relationship exceeds a threshold as defined by the digital stamp, the threshold indicating that the social relationship is too distant to allow access to the additional data associated with the electronic message and wherein the social relationship comprises relationships across multiple social networks and identifying the electronic messages based on a closest social relationship between a sender and a receiver on the multiple social networks.

6. The product of claim 5, wherein the social relationship comprises interpersonal relationships, common interests, common employment, and common attributes.

7. The product of claim 5, wherein displaying, with the electronic message, an indication of the social relationship comprises displaying a summary of the social relationship.

* * * * *